United States Patent
Mankins et al.

(10) Patent No.: US 8,139,504 B2
(45) Date of Patent: Mar. 20, 2012

(54) SYSTEM, DEVICE, AND METHOD FOR UNIFYING DIFFERENTLY-ROUTED NETWORKS USING VIRTUAL TOPOLOGY REPRESENTATIONS

(75) Inventors: David Patrick Mankins, Cambridge, MA (US); Gregory D. Troxel, Stow, MA (US); Karen Z. Haigh, Greenfield, MN (US)

(73) Assignee: Raytheon BBN Technologies Corp., Cambridge, MA (US)

( * ) Notice: Subject to any disclaimer, the term of this patent is extended or adjusted under 35 U.S.C. 154(b) by 254 days.

(21) Appl. No.: 12/419,543

(22) Filed: Apr. 7, 2009

(65) Prior Publication Data
US 2010/0254309 A1    Oct. 7, 2010

(51) Int. Cl.
*H04L 12/28* (2006.01)
(52) U.S. Cl. ......... 370/254; 370/401; 709/242; 709/249
(58) Field of Classification Search .......... 370/229–235, 370/238, 254–258, 338, 400, 401, 464–467; 455/450–452.2; 709/218, 223–226, 238–244, 709/249
See application file for complete search history.

(56) References Cited

U.S. PATENT DOCUMENTS

| | | | |
|---|---|---|---|
| 4,718,002 A | 1/1988 | Carr | |
| 4,827,411 A | 5/1989 | Arrowood et al. | |
| 5,079,767 A | 1/1992 | Perlman | |
| 5,093,824 A | 3/1992 | Coan et al. | |
| 5,117,422 A | 5/1992 | Hauptschein et al. | |
| 5,175,843 A | 12/1992 | Casavant et al. | |
| 5,243,592 A | 9/1993 | Perlman et al. | |
| 5,412,654 A | 5/1995 | Perkins | |
| 5,430,729 A | 7/1995 | Rahnema | |
| 5,541,912 A | 7/1996 | Choudhury et al. | |
| 5,649,119 A | 7/1997 | Kondoh et al. | |
| 5,742,820 A | 4/1998 | Perlman et al. | |
| 5,764,895 A | 6/1998 | Chung | |
| 5,828,835 A | 10/1998 | Isfeld et al. | |

(Continued)

FOREIGN PATENT DOCUMENTS

EP        0447725 A      9/1991

(Continued)

OTHER PUBLICATIONS

"Packet Radio Routing," Gregory S. Lauer, Ch. 11, "Routing in Communications Networks," ed. Martha Steenstrup, Prentice Hall, pp. 352-396 (1995).

(Continued)

*Primary Examiner* — Pao Sinkantarakorn
(74) *Attorney, Agent, or Firm* — Ropes & Gray LLP

(57) ABSTRACT

Systems, devices, and methods for routing data through a first and a second ad-hoc network are described. Routing information structured according to a first routing protocol associated with a plurality of nodes in the first network is received at a border node that is part of at least the first and second ad-hoc networks. Routing information structured according to a second routing protocol associated with a plurality of nodes in the second ad-hoc network is also received. The received routing information is translated from the first routing protocol to the second routing protocol, or vice versa, and disseminated to nodes in the first or second ad-hoc networks. Data packets from nodes in the first ad-hoc network are forwarded to nodes in the second ad-hoc network, or vice versa, based in part on the translated routing information.

36 Claims, 10 Drawing Sheets

U.S. PATENT DOCUMENTS

| | | | |
|---|---|---|---|
| 5,850,592 A | 12/1998 | Ramanathan | |
| 5,878,095 A | 3/1999 | Kainulainen et al. | |
| 5,881,246 A | 3/1999 | Crawley et al. | |
| 5,884,040 A | 3/1999 | Chung | |
| 5,903,735 A | 5/1999 | Kidder et al. | |
| 5,913,921 A | 6/1999 | Tosey et al. | |
| 5,959,989 A | 9/1999 | Gleeson et al. | |
| 5,960,047 A | 9/1999 | Proctor, Jr. et al. | |
| 5,974,327 A | 10/1999 | Agrawal et al. | |
| 6,000,011 A | 12/1999 | Freerksen et al. | |
| 6,028,857 A | 2/2000 | Poor | |
| 6,032,190 A | 2/2000 | Bremer et al. | |
| 6,046,978 A | 4/2000 | Melnik | |
| 6,067,301 A | 5/2000 | Aatresh | |
| 6,069,895 A | 5/2000 | Ayandeh | |
| 6,088,622 A | 7/2000 | Dollin et al. | |
| 6,088,734 A | 7/2000 | Marin et al. | |
| 6,092,096 A | 7/2000 | Lewis | |
| 6,094,435 A | 7/2000 | Hoffman et al. | |
| 6,122,753 A | 9/2000 | Masuo et al. | |
| 6,139,199 A | 10/2000 | Rodriguez | |
| 6,151,308 A | 11/2000 | Ibanez-Meier et al. | |
| 6,173,324 B1 | 1/2001 | D'Souza | |
| 6,215,765 B1 | 4/2001 | McAllister et al. | |
| 6,252,856 B1 | 6/2001 | Zhang | |
| 6,262,976 B1 | 7/2001 | McNamara | |
| 6,272,567 B1 | 8/2001 | Pal et al. | |
| 6,275,492 B1 | 8/2001 | Zhang | |
| 6,304,548 B1 | 10/2001 | Shaffer et al. | |
| 6,304,556 B1 | 10/2001 | Haas | |
| 6,310,883 B1 | 10/2001 | Mann et al. | |
| 6,330,459 B1 | 12/2001 | Crichton et al. | |
| 6,349,091 B1 | 2/2002 | Li | |
| 6,362,821 B1 | 3/2002 | Gibson et al. | |
| 6,385,174 B1 | 5/2002 | Li | |
| 6,385,673 B1 | 5/2002 | DeMoney | |
| 6,385,714 B1 | 5/2002 | Koumura et al. | |
| 6,396,814 B1 | 5/2002 | Iwamura et al. | |
| 6,418,299 B1 | 7/2002 | Ramanathan | |
| 6,456,599 B1 | 9/2002 | Elliott | |
| 6,470,329 B1 | 10/2002 | Livschitz | |
| 6,473,421 B1 | 10/2002 | Tappan | |
| 6,473,434 B1 | 10/2002 | Araya et al. | |
| 6,496,510 B1 | 12/2002 | Tsukakoshi et al. | |
| 6,542,469 B1 | 4/2003 | Kelley et al. | |
| 6,594,268 B1 | 7/2003 | Aukia et al. | |
| 6,628,929 B1 | 9/2003 | Nomura | |
| 6,631,136 B1 | 10/2003 | Chowdhury et al. | |
| 6,633,544 B1 | 10/2003 | Rexford et al. | |
| 6,683,885 B1 | 1/2004 | Sugai et al. | |
| 6,687,781 B2 | 2/2004 | Wynne et al. | |
| 6,714,563 B1 | 3/2004 | Kushi | |
| 6,721,273 B1 | 4/2004 | Lyon | |
| 6,745,224 B1 | 6/2004 | D'Souza et al. | |
| 6,769,043 B1 | 7/2004 | Fedorkow et al. | |
| 6,804,236 B1 | 10/2004 | Mahajan et al. | |
| 6,807,158 B2 | 10/2004 | Krishnamurthy et al. | |
| 6,807,172 B1 | 10/2004 | Levenson et al. | |
| 6,829,222 B2 | 12/2004 | Amis et al. | |
| 6,870,846 B2 | 3/2005 | Cain | |
| 6,954,449 B2 | 10/2005 | Cain et al. | |
| RE38,902 E | 11/2005 | Srisuresh et al. | |
| 6,977,895 B1 | 12/2005 | Shi et al. | |
| 6,977,937 B1 | 12/2005 | Weinstein et al. | |
| 6,980,515 B1 | 12/2005 | Schunk et al. | |
| 6,980,537 B1 | 12/2005 | Liu | |
| 6,990,350 B2 | 1/2006 | Davis et al. | |
| 7,020,501 B1 | 3/2006 | Elliott et al. | |
| 7,020,701 B1 | 3/2006 | Gelvin et al. | |
| 7,042,834 B1 | 5/2006 | Savage | |
| 7,042,837 B1 | 5/2006 | Cassiday et al. | |
| 7,046,628 B2 | 5/2006 | Luhmann et al. | |
| 7,065,059 B1 | 6/2006 | Zinin | |
| 7,068,971 B2 | 6/2006 | Abutaleb et al. | |
| 7,072,952 B2 | 7/2006 | Takehiro et al. | |
| 7,103,344 B2 | 9/2006 | Menard | |
| 7,106,703 B1 | 9/2006 | Belcea | |
| 7,120,120 B2 | 10/2006 | Guerin et al. | |
| 7,177,295 B1 * | 2/2007 | Sholander et al. | 370/401 |
| 7,184,421 B1 | 2/2007 | Liu et al. | |
| 7,200,120 B1 | 4/2007 | Greenberg et al. | |
| 7,215,926 B2 | 5/2007 | Corbett et al. | |
| 7,254,111 B2 | 8/2007 | Choe et al. | |
| 7,266,386 B2 | 9/2007 | Kim et al. | |
| 7,281,057 B2 | 10/2007 | Cain | |
| 7,353,259 B1 | 4/2008 | Bakke et al. | |
| 7,369,512 B1 | 5/2008 | Shubanov et al. | |
| 7,421,257 B1 | 9/2008 | Elliott | |
| 7,606,927 B2 | 10/2009 | Tasman et al. | |
| 7,668,083 B1 | 2/2010 | Elliott | |
| 7,881,229 B2 | 2/2011 | Weinstein et al. | |
| 7,983,239 B1 | 7/2011 | Weinstein et al. | |
| 2001/0007560 A1 | 7/2001 | Masuda et al. | |
| 2001/0034793 A1 | 10/2001 | Madruga et al. | |
| 2001/0040895 A1 | 11/2001 | Templin | |
| 2001/0045914 A1 | 11/2001 | Bunker | |
| 2002/0016869 A1 | 2/2002 | Comeau et al. | |
| 2002/0029214 A1 | 3/2002 | Yianilos et al. | |
| 2002/0057660 A1 | 5/2002 | Park et al. | |
| 2002/0067693 A1 | 6/2002 | Kodialam et al. | |
| 2002/0071392 A1 | 6/2002 | Grover et al. | |
| 2002/0080755 A1 | 6/2002 | Tasman et al. | |
| 2002/0103893 A1 | 8/2002 | Frelechoux et al. | |
| 2002/0108107 A1 | 8/2002 | Darnell et al. | |
| 2002/0131409 A1 | 9/2002 | Frank et al. | |
| 2002/0143755 A1 | 10/2002 | Wynblatt et al. | |
| 2002/0186694 A1 | 12/2002 | Mahajan et al. | |
| 2002/0191545 A1 | 12/2002 | Pieda et al. | |
| 2003/0012168 A1 | 1/2003 | Elson et al. | |
| 2003/0016624 A1 | 1/2003 | Bare | |
| 2003/0058852 A1 | 3/2003 | Luhmann et al. | |
| 2003/0063613 A1 | 4/2003 | Carpini et al. | |
| 2003/0096577 A1 | 5/2003 | Heinonen et al. | |
| 2003/0124976 A1 | 7/2003 | Tamaki et al. | |
| 2003/0126284 A1 | 7/2003 | Houston et al. | |
| 2003/0153338 A1 | 8/2003 | Herz et al. | |
| 2003/0157951 A1 * | 8/2003 | Hasty, Jr. | 455/519 |
| 2003/0174719 A1 | 9/2003 | Sampath et al. | |
| 2003/0202476 A1 | 10/2003 | Billhartz et al. | |
| 2004/0001720 A1 | 1/2004 | Krill et al. | |
| 2004/0003111 A1 | 1/2004 | Maeda et al. | |
| 2004/0027284 A1 | 2/2004 | Leeper et al. | |
| 2004/0029553 A1 | 2/2004 | Cain | |
| 2004/0106408 A1 | 6/2004 | Beasley et al. | |
| 2004/0202164 A1 | 10/2004 | Hooper et al. | |
| 2004/0213167 A1 | 10/2004 | Garcia-Luna-Aceves et al. | |
| 2004/0243702 A1 | 12/2004 | Vainio et al. | |
| 2005/0013613 A1 | 1/2005 | Stevenson et al. | |
| 2005/0030949 A1 | 2/2005 | Shirakawa et al. | |
| 2005/0036442 A1 | 2/2005 | Saleh et al. | |
| 2005/0050221 A1 | 3/2005 | Tasman et al. | |
| 2005/0117914 A1 | 6/2005 | Chuah et al. | |
| 2005/0213586 A1 | 9/2005 | Cyganski et al. | |
| 2007/0106852 A1 | 5/2007 | Lam et al. | |
| 2008/0310390 A1 * | 12/2008 | Pun et al. | 370/347 |
| 2010/0061231 A1 * | 3/2010 | Harmatos et al. | 370/228 |

FOREIGN PATENT DOCUMENTS

| | | |
|---|---|---|
| GB | 2 015 127 A | 9/1979 |
| GB | 2181239 | 4/1987 |
| GB | 2181240 | 4/1987 |
| WO | WO-0137483 A | 5/2001 |
| WO | WO-02/082097 | 10/2002 |

OTHER PUBLICATIONS

"The Organization of Computer Resources into a Packet Radio Network," R.E. Kahn, IEEE Trans. on Communications. COM-25:1, 169-78 (Jan. 1977).

"The DARPA Packet Radio Network Protocols," J. Jubin et al., Proc. of the IEEE, 75:1, 21-32 (Jan. 1987).

"Analysis of Routing Strategies for Packet Radio Networks," J.J. Garcia Lune Aceves et al., Proc. of the IEEE INFOCOM '85, Washington, DC, 292-302 (Aug. 1984)).

"Packet Radio Network Routing Algorithms: A Survey," J.J. Hahn et al., IEEE Communications Magazine, 22:11, 41-7 (Nov. 1984).

"Link-State Routing," John Moy, Ch. 5, "Routing in Communications Networks," ed. Martha Steenstrup, Prentice Hall, pp. 136-157 (1995).

Pecina, J.N., "Unmanned Navigation with a Novel Laser and a Smart Software," Aerospace Conference, 2003. Proceedings. 2003 IEEE, vol. 1, Mar. 8-15, 2003 pp. 305-312.

U.S. Appl. No. 10/752,988, filed Jan. 7, 2004; Joseph Jacob Weinstein et al; Systems and Methods for Constructing a Virtual Model of a Multi-Hop, Multi-Access Network; 70 pages.

Pierce, Allan D., "Nonlinear Effects in Sound Propagation," Acoustics, McGraww-hill Book Company, 1981, pp. 611-614.

Kalyanmoy Deb, "Mult-Objective Optimization Using Evolutionary Algorithms," John Wiley & Sons, Ltd., (Jun. 27, 2001), pp. 85-101.

Ledeczi et al. "Multiple Simultaneous Acoustic Source Localization in Urban Terrain. Institute for Software Integrated Systems," Vanderbilt University, In Proc. 4th International Symposium on Information processing in Sensor Networks (IPSN), 2005, pp. 491-496.

Maroti et al., "Shooter Localization in Urban Terrain", Computer, 37:8, Aug. 2004, pp. 60-61.

Danicki, "The shock wave-based acoustic sniper localization," Nonlinear Analysis, 65 (Sep. 2006), pp. 956-962.

U.S. Appl. No. 10/797,030, filed Mar. 11, 2004; Joseph Jacob Weinstein et al.; Systems and Methods for synchronizing Multiple Copies of a Database Using Database Digest; 50 pages.

Stoughton, R.B., "SAIC Sentinel Acoustic Counter-Sniper System," Proceedings of SPIE, vol. 2938, Nov. 19, 1996, pp. 276-284, XP00251780, Section 3.

European Search Report in European Application No. EP08004009 dated Mar. 11, 2009.

Lin, et al., "Adaptive Clusterin for Mobile Wireless Networks," IEEE Journal on Selected Areas in communications, 15(7):1-21 (1997).

Mount, Dave, "CMSC 451: Lecture 11 : Articulation Points and Biconnected Components," Tuesday, Oct. 6, 1998. www.cs.umd.edu/~samir/451/bc.ps. pp. 1-5.

Khuller, et al., "Biconnectivity Approximations and Graph Carvings," STOC '92 Proceedings of the twenty-fourth annual ACM Symposium on Theory of Computing, (1992) pp. 759-770.

Liao, et al., "GRID: A Fully Location-Aware Routing Protocol for Mobile Ad Hoc Networks," Telecommunications Systems, 18(1):37-60 (2001).

Garg, et al, "Improved Approximation Algorithms for Biconnected Subgraphs via Better Lower Bounding Techniques," Department of Computer Science and Engineering, Indian Institute of Technology, New Delhi, pp. 103-111 (1993).

Li, et al., "Sending Messages to Mobile Users in Disconnected Ad-Hoc Wireless Networks," in ACM MOBICOM conference (2000) pp. 44-55.

McAuley, et al., "Self-Configuring Networks," MILCOM 2000, 21st Century Military Communications Conference Proceedings, vol. 1, pp. 315-319 (2000).

Jennings, et al., "Topology Control for Efficient Information Dissemination in Ad-hoc Networks," Jet Propulsion Laboratory, California Institute of Technology, pp. 1-7.(2002).

Hsu, et al., "Simpler and Faster Biconnectivity Augmentation," Journal of Algorithms, 45:55-71 (2002).

Winfield, Alan, "Distributed Sensing and Data Collection Via Broken Ad Hoc Wireless Connected Networks of Mobile Robots," Springer, pp. 273-282, (2000).

Waligore, "Test and Training Technology Workshop" Applied Research Laboratories, Feb. 15, 2002, 27 pages.

SEA (Group) Ltd., "Terra SAR Equipment Development", 2003 1 page.

Ramanathan et al., "Topology Control of Multihop Wireless Networks using Transmit Power Adjustment," Proc. IEEE INFOCOM 2000, Mar. 2000, 10 pages.

Prague, "Power Line Carrier Techniques Applied to Spacecraft Data Handling, Data Systems in Areospace DASIA", Jun. 2-6, 2003, Czech Republic, 16 pages.

Pascall et al., "Commercial Satellite Communication", 1997 pp. 78-91.

McKeown, "A Quick Tutorial on IP Router Design", Optics and Routing Seminar, Oct. 10, 2000.

Magness, Rodger, A Comparison of CAN and Bluetooth Protocols—A Study for Application of CAN over Bluetooth for Wireless Onboard Data Handling for a Spacecraft Sensor Networr, NASA Astrophysics Data System, 24 pages, 2003.

Lee, Sung-Ju et al. A Performance Comparison Study of Ad Hoc Wireless Multicast Protocols, University of California, 10 pages, 2000.

Lee, S. et al. "Neighbor Supporting Ad Hoc Multicast Routing Protocol" Seoul National Univeristy, 8 pages, 2000.

Karp, B. et al. GPSR: Greedy Perimeter Stateless Routing for Wireless Networks. ACM/IEEE International Conference on Mobile Computing and Networking (MobiCom 2000).

Jacquet et al. "Optimized Link State Routing Protocol for Ad Hoc Networks", Proc. IEEE INMIC, Pakistan, pp. 1, 2001.

Everett, "GPM Reference Interfaces", May 30, 2001, 9 pages.

Choudhury et al., "Using Directional Antennas for Medium Access Control in Ad Hoc Networks", MOBICOM 002, Sep. 23-28, 2002, pp. 59-70.

Bevan et al., "Free-Space Optical Data Bus for Spacecraft", Earth Science Technology Conference, Jun. 24-26, 2003, 6 pages.

Basu et al., "Movement Control Algorithms for Realization of Fault-Tolerant Ad Hoc Robot Networks," IEEE Network, pp. 36-44, Jul./Aug. 2004.

Khuller, et al., "Biconnectivity Approximations and Graph Carvings," Journal of the ACM, 41(2):214-235 (1994).

* cited by examiner

SYSTEM, DEVICE, AND METHOD FOR UNIFYING DIFFERENTLY-ROUTED NETWORKS USING VIRTUAL TOPOLOGY REPRESENTATIONS

GOVERNMENT CONTRACT

The U.S. Government has a paid-up license in this invention and the right in limited circumstances to require the patent owner to license others on reasonable terms as provided for by the terms of Contract No. FA8750-06-C-0199 awarded by DARPA.

BACKGROUND OF THE INVENTION

1. Field of the Invention

The present invention is directed to routing data in networks. It particularly concerns effectively routing data between two or more Mobile Ad-hoc Networks (MANETs) networks with different routing protocols, including, but not limited to, link-state or distance vector protocols.

2. Background Information

In recent years, there has been a large increase in the use of communication networks which are self-forming and self-configuring. Mobile ad hoc networks (MANETs) or disruption tolerant networks (DTNs) are an example of such networks. They include mobile nodes which communicate wirelessly and are free to move about, such that at a given point in time, wireless connectivity in the form of a multi-hop or multi-link graph or an "ad hoc" network exists between the mobile nodes.

A MANET is beneficial for self-forming, self-configuring, and self-healing operation, i.e., operation in an environment where the media and communications channels undergo frequent changes (e.g., over free space, optical, radio-frequency (RF), underwater acoustic links) and where nodes in a network freely enter and leave the network. Typically, the mobile nodes in a MANET will form a link, i.e., a wireless communication path, and exchange data packets and routing information through the link if they are within a suitable communication range.

MANETs are generally characterized by dynamic network topologies, bandwidth- and energy-constrained operation, variable capacity links between nodes in the network, and limited network security. MANETs are different from wired networks in at least two ways. First, mobile nodes in MANETS are typically dependent on batteries for power. Each transmission and receipt of data requires power. This power consumption sharply increase the importance of reducing the number of transmissions needed to direct a packet to its final destination. It is important to be able to route packets efficiently through the network, thereby reducing the cost associated with transmitting a message. Second, because of a frequently-changing network topology, routing information can rapidly become stale. Nevertheless, new MANET systems are being increasingly deployed, especially for military applications.

In many MANETs or DTNs, network nodes generally operate under bandwidth- and energy constraints. As noted above, nodes have limited power available for receiving and transmitting messages. In addition, links or connections in the network change frequently. In environments in which two or more MANETs exist, significant efficiency gains are frequently missed due to the networks failure to share routing information effectively. For instance, the most cost-efficient, for example, the fastest or lowest energy-consuming or lowest bandwidth-consuming route for a data packet may involve efficiently routing the data packet from a node in one of the MANETs through a node in the second, different MANET. Such routing may require the MANETs to share network routing information. However, current MANETS typically only provide for limited sharing of network routing information between the MANETs. This is a result, in part, of MANETs in some instances utilizing, mutually incompatible routing protocols.

This lack of shared routing information prevents multiple interconnected yet independent MANETs (e.g., MANETs operated by different entities and/or with different routing protocols) to efficiently route data packets to one another, thereby achieving the benefits of a single larger MANET.

SUMMARY OF THE INVENTION

The invention, in various embodiments, addresses deficiencies in the prior art by providing systems, devices, and methods that enable network routing efficiency by providing for shared network routing information between the networks even when the networks utilize normally incompatible routing protocols. Specifically, the systems, devices, and methods described herein can provide for a translation of routing information used by two or more different ad-hoc networks to create a virtual topology of a combination of the networks such that efficient routing is achieved when routing packets through the networks.

As used herein, the term "virtual topology" refers to a collection of routing information describing the state of a "virtual network" which includes the nodes of at least two independent interconnected ad-hoc networks as if they were in fact one larger, combined ad-hoc network. For example, the virtual topology may be stored without limitation as a list, a set of link-state announcements, a table with information on links in the ad-hoc network, or any combination thereof.

The systems and methods herein provide for full end-to-end routing solutions via one or more border nodes that are common or shared in the two or more ad-hoc networks. In this manner, the independent ad-hoc networks can interface with each other to provide a single, heterogeneous (i.e. supporting more than one routing protocol) ad-hoc network. As a result, data packets can be efficiently routed from one ad-hoc network to another ad-hoc network through the one or more border nodes because ad-hoc network routing information has been shared between the two or more ad-hoc networks to create a virtual topology.

In one aspect, the invention relates to systems and methods for routing data between a first ad-hoc network and a second ad-hoc network. The first and second ad-hoc networks utilize different routing protocols. For example, one ad-hoc network may utilize a link-state protocol, while the other ad-hoc network utilizes a distance vector protocol. The ad-hoc network routing information is disseminated in the first and/or second ad-hoc networks using virtual topology representations of the combined ad-hoc network, or vice-versa.

In another aspect, the invention relates to a computer-readable medium storing computer executable instructions, which, when executed by a processor, cause the processor to carryout out a method for routing data through a first ad-hoc network and a second ad-hoc network. The processor receives network routing information structured according to the routing protocol of the first ad-hoc network associated with a plurality of nodes in the first ad-hoc network. The processor also receives network routing information structured according to the routing protocol of the second ad-hoc network associated with a plurality of nodes in the second ad-hoc network. From the received routing information, the processor generates a virtual topology of a combination of the first and second ad-hoc networks according to the routing protocol of the first ad-hoc network. This virtual topology may be disseminated to nodes in the first ad-hoc network. The processor may forward a data packet from a node in the first ad-hoc network to a node in the second ad-hoc network based at least in part on this virtual topology.

In some embodiments, the processor may also generate a second virtual topology of a combination of the first and second ad-hoc networks according to the routing protocol of the second ad-hoc network. The processor disseminates the generated second virtual topology to nodes in the second ad-hoc network. The processor may then forward a data packet from a node in the second ad-hoc network to a node in the first ad-hoc network based at least in part on the generated second virtual topology.

In one embodiment, the virtual topology includes a list of nodes in the first and second ad-hoc networks with associated costs of information transmission through each of the nodes. In another embodiment, the virtual topology includes a list of nodes in the first and second networks with associated minimum costs of reaching each node in the first ad-hoc network.

In some embodiments, the first routing protocol in the first ad-hoc network is a reactive protocol, while the second routing protocol in the second ad-hoc network is proactive. In alternative embodiments, the first routing protocol in the first network is a proactive protocol, and the second routing protocol in the second ad-hoc network is reactive. In other embodiments, the first routing protocol is a link-state protocol, and the second routing protocol is a distance-vector protocol. In alternative embodiments, the first routing protocol is a distance-vector protocol, and the second routing protocol is a link-state protocol. In certain embodiments, both the first and second routing protocols are link-state protocols. In other embodiments, both the first and second routing protocols are distance-vector protocols.

In another aspect, the invention relates to a method for routing data through a first ad-hoc network and a second ad-hoc network. A border node, belonging to the first and second ad-hoc networks, receives network routing information structured according to the routing protocol of the first ad-hoc network associated with a plurality of nodes in the first ad-hoc network. This border node also receives routing information structured according to the routing protocol of the second ad-hoc network associated with a plurality of nodes in the second ad-hoc network. Based on the received routing information, the border node generates a virtual topology of a combination of the first and second ad-hoc networks according to the routing protocol of the first ad-hoc network. The border nodes then disseminates this virtual topology to nodes in the first ad-hoc network. The border node also forwards a data packet from a node in the first ad-hoc network to a node in the second ad-hoc network based at least in part on this virtual topology.

In some embodiments, the method further comprises the border node generating a second virtual topology of a combination of the first and second ad-hoc networks according to the second routing protocol. This second virtual topology is disseminated to nodes in the second ad-hoc network. A data packet may then be forwarded from a node in the second ad-hoc network to a node in the first ad-hoc network based at least in part on the generated second virtual topology.

In another aspect, the invention relates to a device for routing data through a first ad-hoc network and a second ad-hoc network. The device comprises a first transceiver in communication with at least one node in the first ad-hoc network, a second transceiver in communication with at least one node in the second ad-hoc network, and a control unit which is in communication with the first and second transceivers. In preferred embodiments, the control unit comprises a processor, and a memory storing computer executable instructions. When executed by the processor, the computer executable instructions cause the processor to carryout out a method for routing data through the first and second ad-hoc networks. The processor receives network routing information structured according to the routing protocol of the first ad-hoc network associated with a plurality of nodes in the first ad-hoc network. The processor also receives network routing information structured according to the routing protocol of the second ad-hoc network associated with a plurality of nodes in the second ad-hoc network. From the received routing information, the processor generates a virtual topology of a combination of the first and second ad-hoc networks according to the routing protocol of the first network. This virtual topology may be disseminated to nodes in the first ad-hoc network. The processor may forward a data packet from a node in the first ad-hoc network to a node in the second ad-hoc network based at least in part on this virtual topology.

In some embodiments, the processor may also generate a second virtual topology of a combination of the first and second ad-hoc networks according to the second routing protocol. The generated second virtual topology is then disseminated to nodes in the second ad-hoc network. The processor may then forward a packet from a node in the second ad-hoc network to a node in the first ad-hoc network based at least in part on this second virtual topology.

In this application, embodiments will be described in reference to mobile ad hoc networks (MANETs). It is to be understood that the systems and methods discussed herein are applicable to any two networks, e.g., any suitable wireless or wired network. The systems and methods described herein could also be applied to any combination of one or more wireless networks or one or more wired networks, e.g., a disruption tolerant network (DTN) neighboring a MANET, or any combination thereof.

BRIEF DESCRIPTION OF THE DRAWINGS

The invention description below refers to the accompanying drawings, of which.

DESCRIPTION OF CERTAIN ILLUSTRATIVE EMBODIMENTS

To provide an overall understanding of the invention, certain illustrative embodiments will now be described. However, it will be understood by one of ordinary skill in the art that the methods described herein may be adapted and modified as is appropriate for the application being addressed and that the systems and methods described herein may be employed in other suitable applications, and that such other additions and modifications will not depart from the scope hereof.

Figure 1:
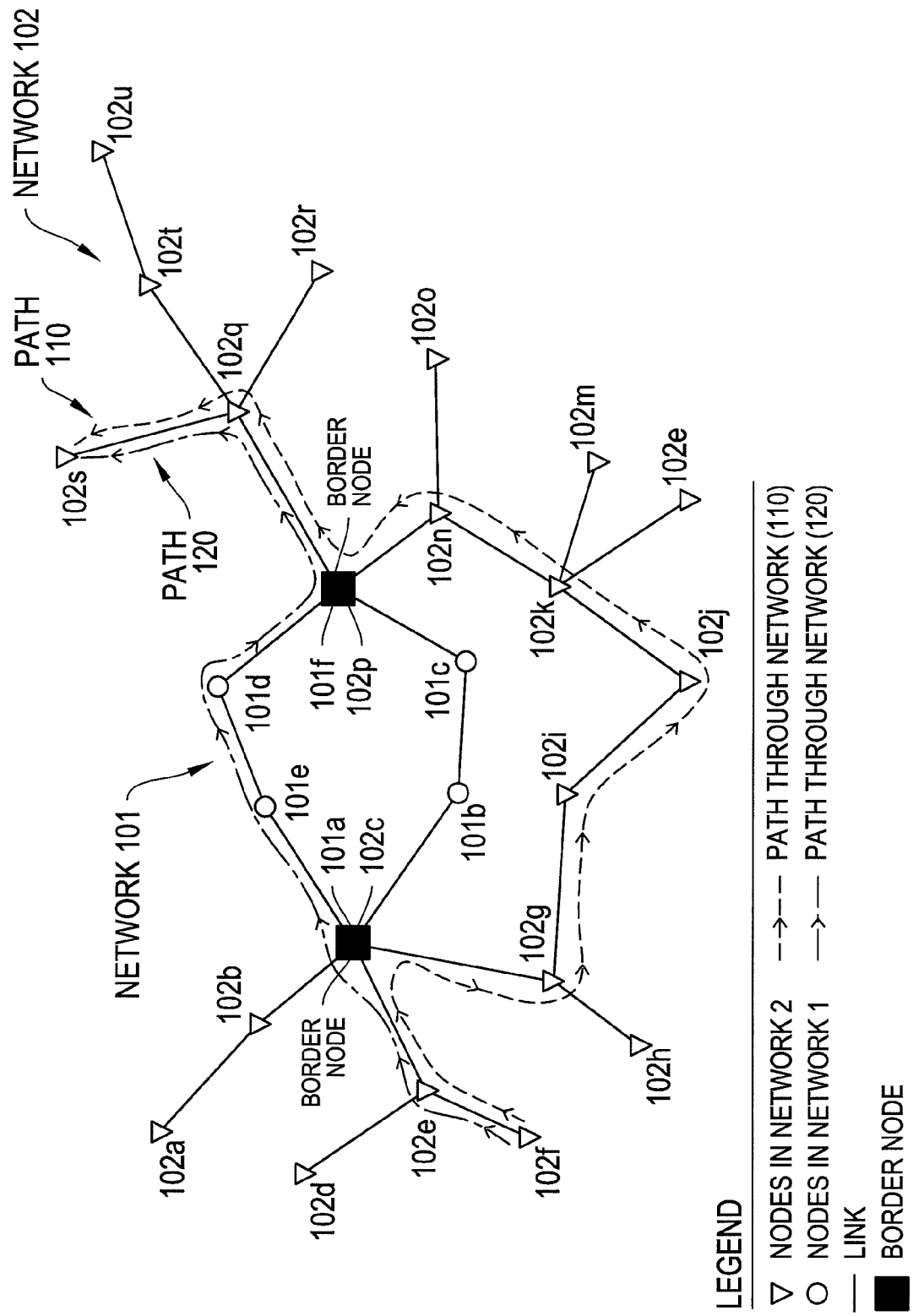
FIG. 1 is a diagram of two ad-hoc networks with two border nodes, illustrative of the networks in which the systems and methods described herein may be implemented.

FIG. 1 is a diagram of two ad-hoc networks, Network 101 and Network 102, in which the systems, devices, and methods described herein may be implemented. Each of the two networks comprises several nodes. Network 101 comprises nodes 101a-101f, designated by circles. Network 102 comprises nodes 102a-102u, designated by inverted triangles. There are two border nodes common to both Network 101 and Network 102. The first border node is labeled 101a/102c and the second border node is labeled 101f/102p. Each of the border nodes is designated by a square. In each network, some of these nodes have communication links to other nodes. For example, in network 102, nodes 102a and 102b are linked, while in network 101, nodes 101e and 101e are linked. The links between nodes in the network may be wireless, wired, optical, radio-frequency (RF), underwater acoustic links, or any combination thereof. Nodes that have a communication link may be referred to as "neighbors" or neighboring nodes.

Although network 101 and network 102 are shown to have a certain connectivity, at certain times, certain nodes in the networks may not be linked to other nodes. For example, if the network 101 operates as a mobile ad-hoc network (MANET), then certain nodes may link with other nodes only when environmental and/or radio frequency (or other communication) conditions enable such linking.

FIG. 1 depicts two network paths 110 and 120, via which one or more data packets may be routed along paths through network 101 and network 102. Network path 110 comprises nodes 102f, 102e, 101a/102c 102g, 102i, 102j, 102k, 102n, 101f/102p, 102q, and 102s. Network path 120 comprises nodes 102f, 102e, 101a/102c, 101e, 101d, 101f/102p, 102q, and 102s. Each of these paths includes the two borders nodes. The two border nodes are capable of communicating with nodes in both network 101 and network 102.

In conventional MANETs, network path 120 would not exist. Typically, routing information is not be shared between network 101 and network 102. Furthermore, the routing protocols in each of the networks may be different. For instance, network 101 may be a MANET with a link-state routing protocol, while network 102 may be a MANET with a distance-vector protocol, or network 101 may be a MANET with a first distance-vector protocol, while network 102 may be a MANET with a second, different distance-vector protocol. Thus, in a conventional MANET, node 102c, when operating as part of network 101, would be unaware that a path existed through network 102 to node 102p. Instead, packets from node 102c to node 102p would be routed entirely through network 102, losing out on the efficiencies available by routing through network 101.

Each of the network paths 110 and 120 has an associated transmission cost. This cost may be related to energy- or bandwidth-constraints. The cost of various links may vary greatly based on a number of factors including the quality of the wireless channel and the distance separating the nodes forming the link. For illustrative purposes, it will be assumed herein that each communication link in the networks is equally costly such that each communication link traveled, or each "hop", has an associated transmission cost of 1. Thus, network path 110 includes 10 links or hops and has an associated transmission cost of 10, while network path 120 includes 7 hops and has an associated transmission cost of 7. Thus, failure to take into potential transmission paths through network 101, in this example, results in an excess transmission cost of 43%

MANETs (and networks in general) can using different routing protocols that may be categorized as proactive or reactive protocols. Many link-state protocols are proactive routing protocols, while most distance-vector protocols are reactive protocols. Proactive routing protocols enable routing strategies in which a view of the current network topology is stored at all times, while reactive routing protocols enable strategies that only store a route to a destination when a message is to be sent to the destination. Proactive routing protocols allow a network to establish connections between nodes in a more timely fashion at the cost of increased control traffic and storage space.

Link-state routing protocols, e.g., optimized link-state routing (OLSR) or open shortest path first (OSPF) routing, are focused on reflecting the topology of the network in each node, and using the stored network topology in making decisions on how to efficiently route data packets in the network. Distance-vector routing protocols are so called because, for each destination, they store a network path cost (the "distance") as well as the next network hop toward the destination (the "vector"). Networks which utilized distance-vector protocols generally store less network information at each node, and information regarding changes in network topology may remain localized to a few nodes. Border gateway protocol (BGP) is an example of a proactive distance-vector routing protocol, while dynamic source routing (DSR), ad-hoc on demand distance vector (AODV) routing, and dynamic MANET on-demand (DYMO) routing protocols are reactive distance-vector routing protocols. It will be understood by those skilled in the art that the systems and methods discussed herein may be used with any two neighboring networks utilizing any two routing protocols.

In some link-state routing protocols, each network node transmits its view of the network (its list of neighbors perhaps with an associated cost of the link to the neighbor) to its neighboring nodes. This view of the network is periodically propagated, e.g., via link-state updates, throughout the entire network, and each node in the network is able to assemble the separate views into a complete topology of the network, which it can use to calculate the shortest (or least-cost) network path to any given destination from that node. Link-state routing typically uses proactive updates of the link-state to be propagated across the network.

In some distance-vector routing protocols, each network node i keeps track of the cost dij(x) of reaching destination x through each of its the node's neighbors j. Each node periodically tells its neighbors its estimate of the cost to reach each destination, and the neighbors use this information to update their own view of the network. Thus, node i will create a list of costs associated with reaching all destinations x, and transmit this list to each of its neighbors j. Each neighboring node j will update its list of distance vectors accordingly. The transmission of distance vectors can be done proactively such that each node stores the distance to all destinations reachable from that node, or reactively such that each node will only store information on recently active destinations. In other distance-vector routing protocols, each node i stores and keeps track of only the minimum distance $dij_{min}(x)$ of reaching each destination x and the neighbors j associated with that minimum distance.

As will be described now in more detail in relation to FIGS. 2-6, the systems, devices, and methods described herein allow for two or more networks to share routing information such that data packets are routed efficiently through the two or more networks.

Figure 2:
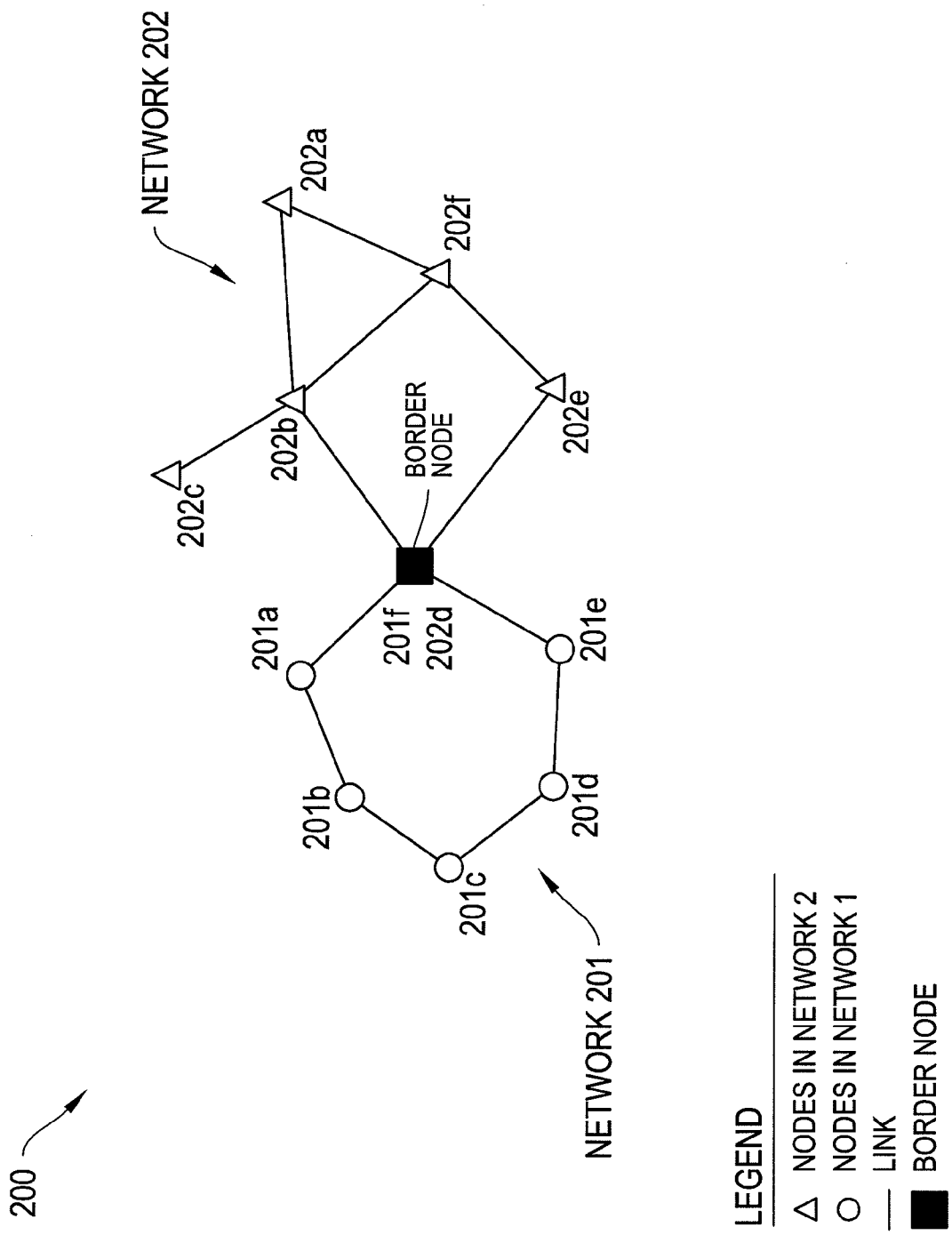
FIG. 2 is a diagram of two ad-hoc networks sharing a border node, illustrative of the networks in which the systems and methods described herein may be implemented.

FIG. 2 is a diagram of an exemplary network structure 200, comprising two ad-hoc networks: ad-hoc network 201 and ad-hoc network 202, in which the systems and methods described herein may be implemented. For the purposes of later discussion, ad-hoc network 201 comprises nodes 201-201f depicted by circles, while ad-hoc network 202 comprises nodes 202a-202f depicted by inverted triangles. The two ad-hoc networks share a border node 201f/202d depicted by a square. In each ad-hoc network, some of these nodes have communication links to other nodes. For example, in ad-hoc network 202, nodes 202a and 202b are linked, while in ad-hoc network 201, nodes 201d and 201e are linked.

Figure 3:
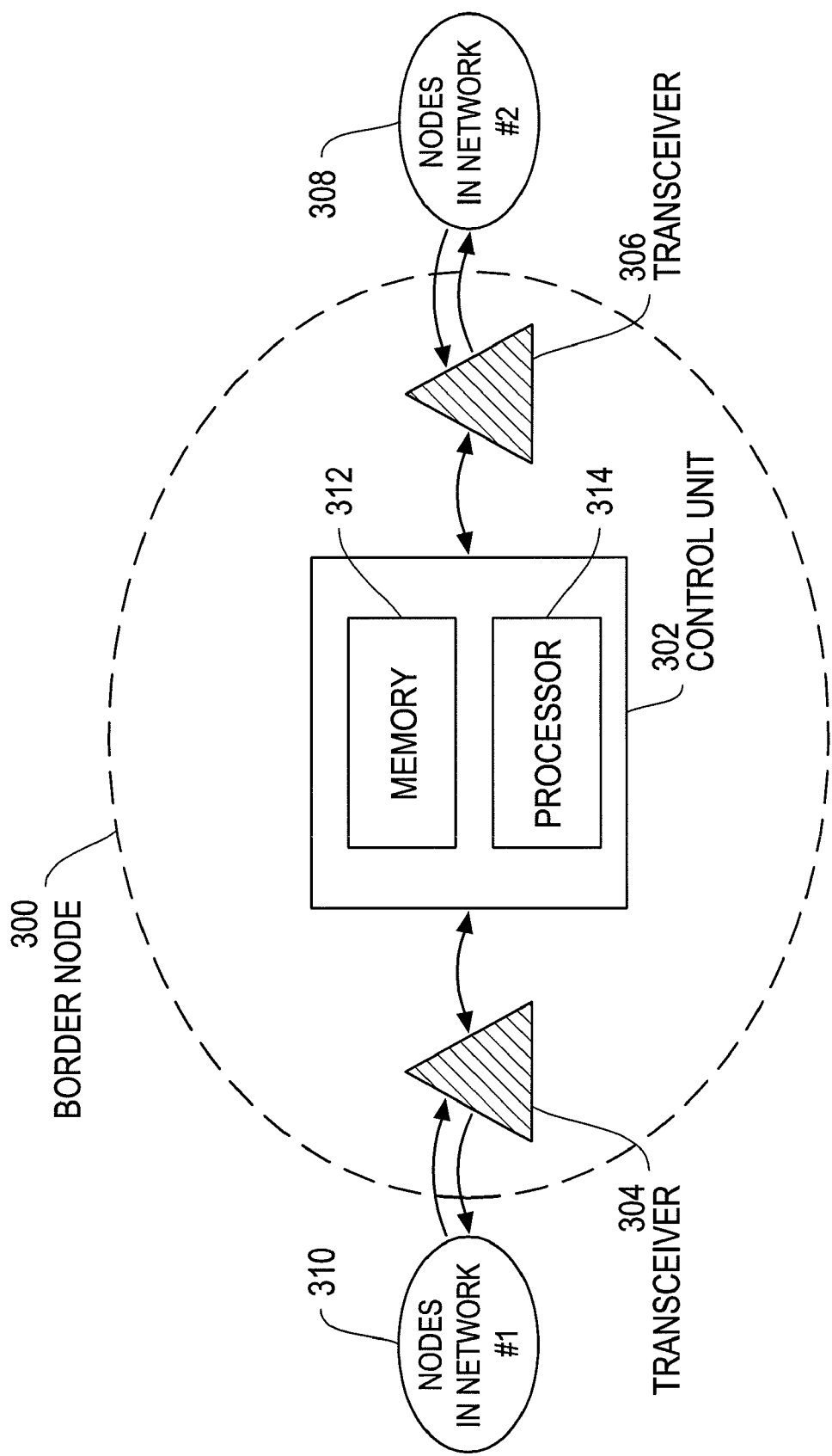
FIG. 3 is a block diagram of the elements within a border node, according to an illustrative embodiment.

FIG. 3 is a functional block diagram of a general purpose computer and/or communications system 300 which may provide the functionality of a border node, according to an illustrative embodiment. Such a border node may be a part of the networks shown in FIGS. 1 and 2, e.g., border node 201f/202d in FIG. 2.

Border node 300 comprises a control unit 302, and two transceivers (i.e. transmitter/receiver): transceiver 304 and transceiver 306. Control unit 302 comprises a processor 314 and a memory 312 capable of storing computer-executable instructions, e.g., RAM, DRAM, and/or high-speed cache memory. The processor 314 may include a single microprocessor or a plurality of microprocessors. In operation, memory 312 stores at least portions of instructions and data for execution by processor 314. In particular, memory 312 may store a database (e.g., a routing table) enabling the processing, routing, and transmission of data packets in a communications network, e.g., network structure 200 of FIG. 2. Optionally, system 300 may include a mass storage device (not shown in FIG. 3) that may include one or more magnetic disk or tape drives or optical disk drives or flash drives, for storing data and instructions for use by processor 314.

Transceiver 304 contains a radio, and is capable of communicating with one or more nodes in a first network 310 with a first routing protocol e.g. a link state or distance vector protocol. Transceiver 306 contains a radio, and is capable of communicating with one or more nodes in a second network 308 with a second routing protocol, e.g., a different link state or different distance vector protocol. Both transceivers 304 and 306 are capable of communicating with control unit 304. Although two transceivers are shown in border node 300, in some embodiments, only one transceiver which is capable of communicating with both networks 308 and 310 is used. Processor 314 executes the code stored in memory to enable the sharing of network routing information between network 310 and network 308 as outlined in process 400 in FIG. 4A.

Figure 4A:
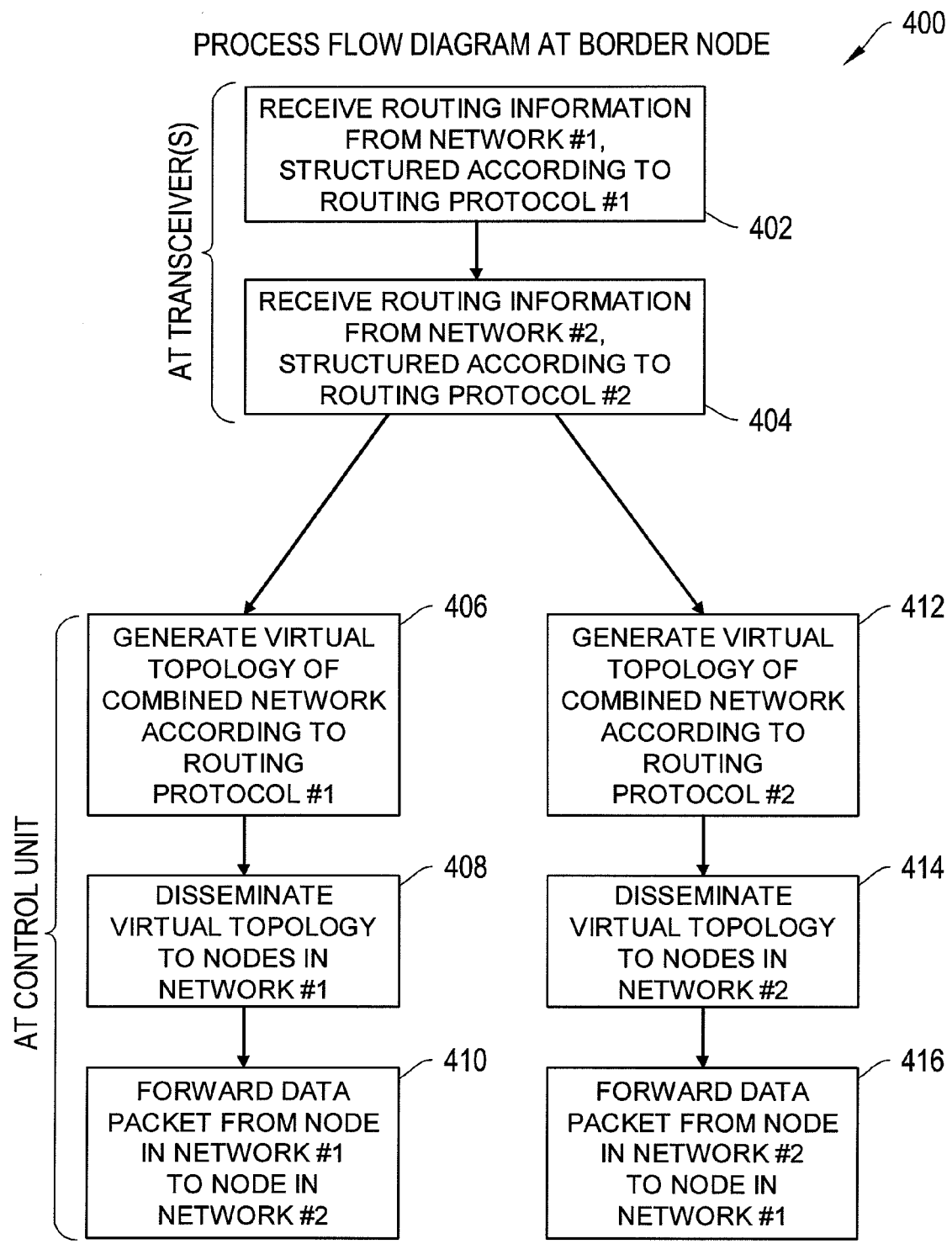
FIG. 4A is a process flow diagram for use by a border node for generating and disseminating a virtual topology of a combination of a first and second ad-hoc network, according to an illustrative embodiment.

FIG. 4A is a process flow diagram for a process 400 carried out by a border node, e.g., border node 300 in FIG. 3 or border node 201f/202d in FIG. 2, for generating and disseminating a virtual topology of a combination of two ad-hoc networks. Referring to FIGS. 2, 3, and 4A, the process 400 begins with the transceiver 304 of border node 300 receives routing information for a first ad-hoc network e.g. network 201 (step 402). This routing information is structured according to a first routing protocol. In some embodiments, the first routing protocol is a link-state protocol as will be seen in relation to process 440 described in FIG. 4B. In other embodiments, the first routing protocol is a distance-vector protocol as will be seen in relation to process 460 in FIG. 4C.

Transceiver 306 of border node 300 then receives routing information for a second ad-hoc network e.g. network 202 (step 404). This routing information is structured according to a second routing protocol. In some embodiments, the second routing protocol is a link-state protocol. In other embodiments, the second routing protocol is a distance-vector protocol. In some embodiments, a single transceiver receives routing information from both the first and the second networks.

In one embodiment, control unit 302 generates a virtual topology of a combination of the two networks structured according the first routing protocol (step 406). For example, if the first routing protocol is a link-state protocol, control unit 302 generates a virtual topology structured according to a link-state protocol. In this case, the virtual topology would include a list of network nodes and the known communication links between the network nodes for the combined network. For example, this virtual topology may be a network topology diagram or network "snapshot" for the combined network, as will be shown below in relation to virtual topology 500a in FIG. 5A. Control unit 302 disseminates this virtual topology to nodes in the first network (step 408), for example, in the form of one or more link-state announcements. Control unit 302 may forward a data packet from a node in the first network to a node in the second network, or vice-versa, based in part on the generated virtual topology (step 410).

In another embodiment, control unit 302 in border node 300 generates a virtual topology of a combination of the two ad-hoc networks structured according the second routing protocol (step 412). For example, if the second routing protocol is a distance-vector protocol, control unit 302 generates a virtual topology structured according to the distance-vector protocol. In this case, the virtual topology would include a list of network nodes and the minimum (over all possible network paths) associated cost or distance for data packet transmission to each of those nodes in the combined network. This virtual topology may be a network topology diagram of the combined network from the point-of-view of the border node, such that each link is weighted by the associated distance vector, as will be shown below in relation to virtual topology 600a in FIG. 6A. Control unit 302 disseminates this virtual topology to nodes in the second network (step 414). Control unit 302 may forward a data packet from a node in the second network to a node in the first network, or vice-versa, based in part on the generated virtual topology (step 416).

In an alternative embodiment, the control unit 302 forwards the routing information received from the first and second networks to another computing device to generate and disseminate the virtual topology. Alternatively, the control unit may itself be located on another computing device in communication with the border node.

Figure 4B:
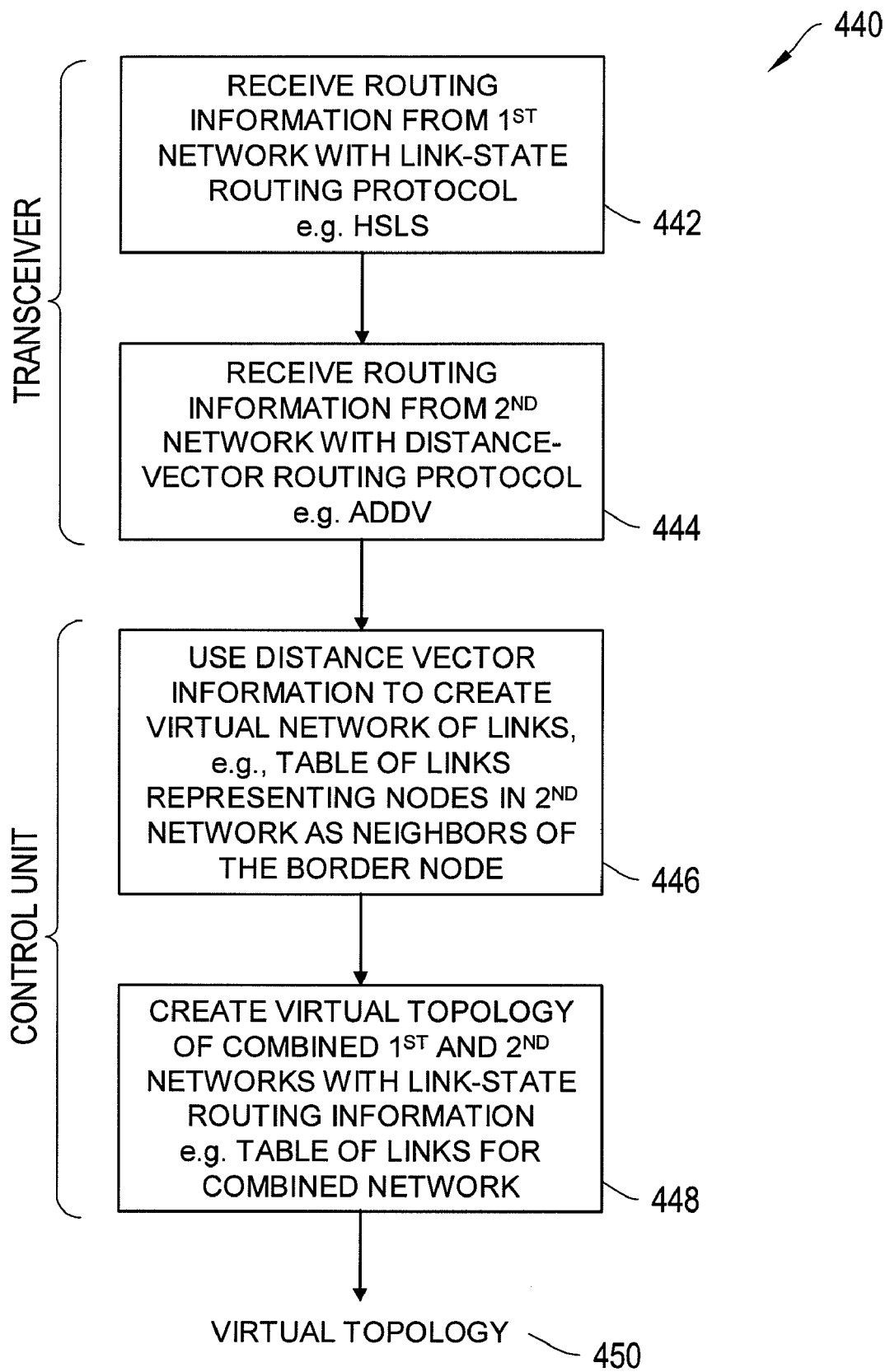
FIG. 4B shows a process flow diagram for use by a border node for generating a virtual topology of a combination of an ad-hoc network structured according to a link-state protocol, according to an illustrative embodiment.

FIG. 4B is a process flow diagram for a process 440 carried out by a border node, e.g., border node 300 of FIG. 3 or border node 201*f*/202*d* of FIG. 2, for generating and disseminating a virtual topology 450 of a combination of two ad-hoc networks in which the first ad-hoc network uses a link-state routing protocol and the second ad-hoc network uses a distance-vector protocol. This virtual topology 450 is structured according to the link-state protocol.

Referring to FIGS. 2, 3, 4B, 5A and 5B, process 440 begins with the transceiver 304 in border node 300 receiving routing information from a first ad-hoc network e.g. network 201 (step 442). This network information is structured according to a link-state protocol. Transceiver 306 in border node 300 then receives routing information for a second ad-hoc network e.g. network 202, structured according to a distance-vector protocol (step 444). Control unit 302 of border node 300 generates a virtual combination of the two networks structured according to the link-state protocol (step 446). The generated structure may be stored in the form of a routing information table describing the connectivity between nodes in the combined network, a list of links between nodes in the combined network, or in any other suitable manner. A virtual topology can then be created based on this table (step 448).

Referring now to FIGS. 2, 3, 4B, and 5A, assume that for ad-hoc network structure 200 in FIG. 2, ad-hoc network 201 utilizes a link-state protocol and ad-hoc network 202 utilizes a distance-vector protocol. Furthermore, assume that each node 202*a*-202*f* in network 202 creates and stores a list of distances associated with reaching all destination nodes in network 202 via network paths involving the node's neighbors.

The link-state based virtual topology of the combined network created by control unit 302 (step 448) could be obtained by interpreting the distance-vector routing information to obtain link-state representation. For instance, node 202*e* can inform border node 202*d*/201*f* that it is 1 hop from node 202*f*, 2 hops from each of nodes 202*a* and 202*b*, and 3 or 4 hops from node 202*c*. This information implies that there is a link between nodes 202*e* and 202*f*. Similarly, node 202*b* can inform border node 202*d*/201*f* that node 202*b* is 1 hop from nodes 202*c* and 202*a*, 1 or 2 hops from node 202*f*, and 2 hops from node 202*e*. This information implies that there is a link between nodes 202*b* and 202*c*, a link between nodes 202*b* and 202*a*, and a link between nodes 202*b* and 202*f*. In addition, border node 202*d*/201*f* will know that it is 1 hop from nodes 202*e* and 202*b*. Thus, there is a link between the border node and node 202*b*, as well as between the border node and node 202*e*. The combination of this information also implies that nodes 202*f* and 202*a* are linked.

Figure 5A:
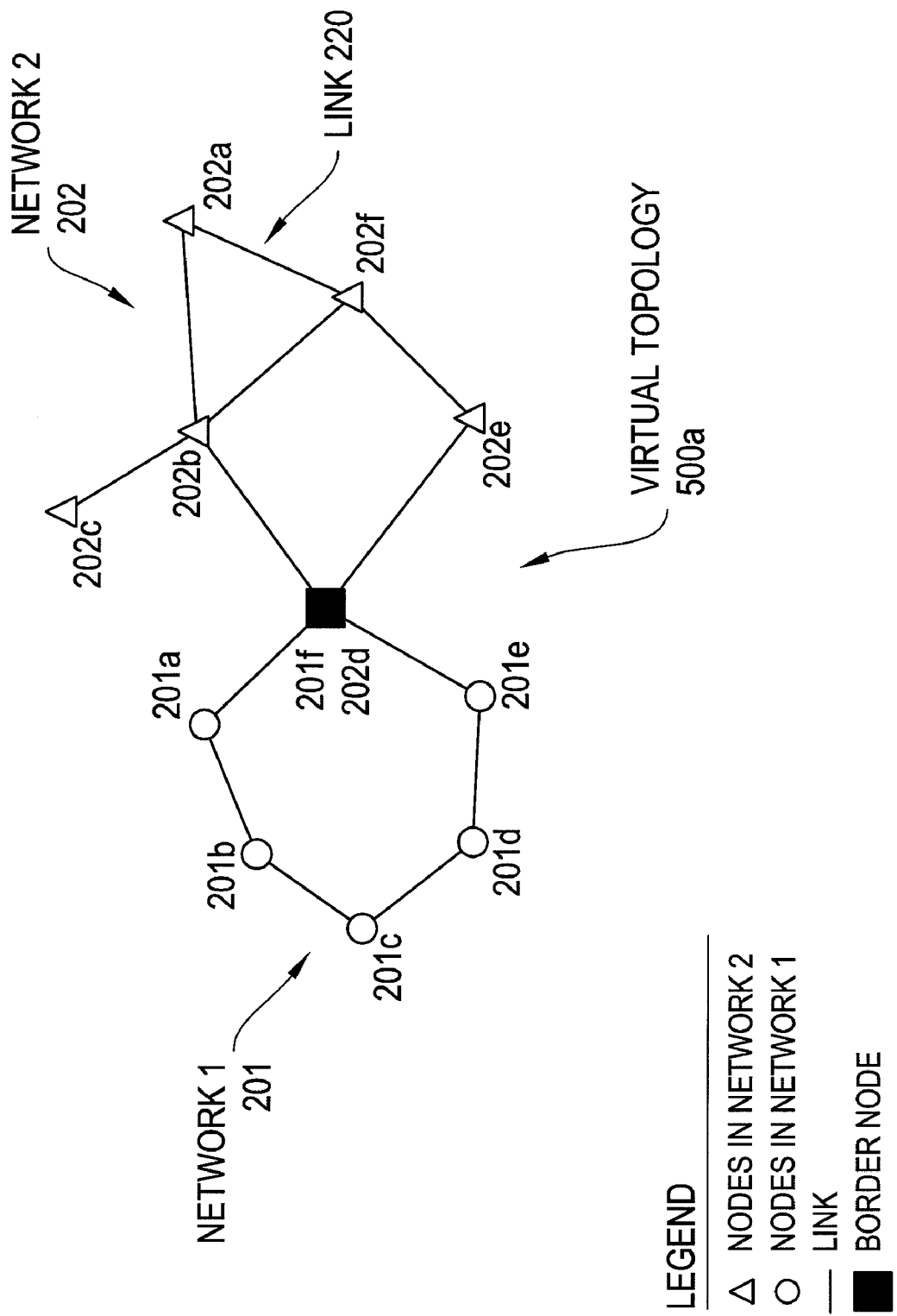
FIG. 5A is an exemplary virtual topology of the networks in FIG. 2 structured according to a link-state routing protocol of the second ad-hoc network assuming a first distance-vector protocol in the first ad-hoc network, according to an illustrative embodiment.
Figure 5B:
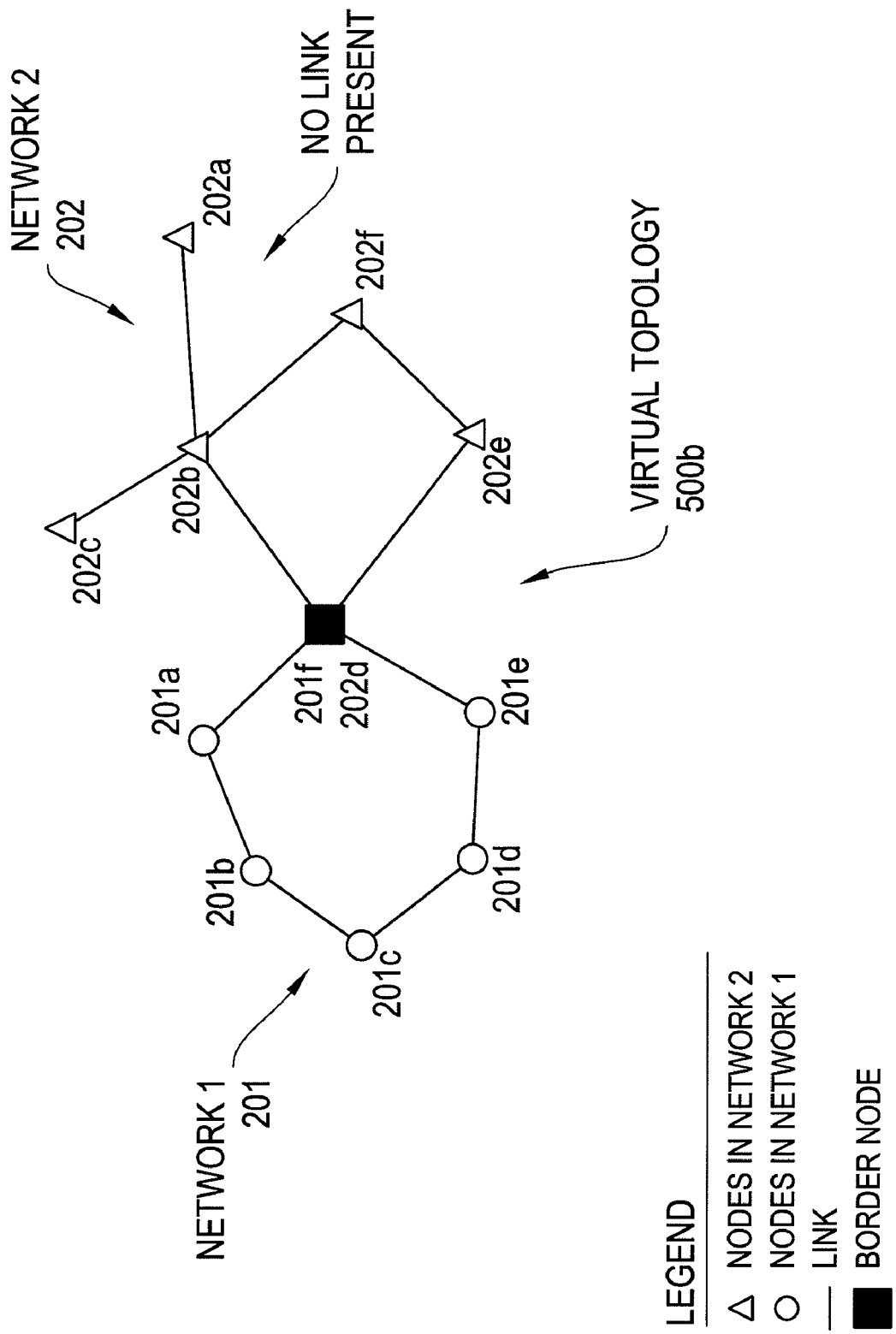
FIG. 5B is an exemplary virtual topology of the networks in FIG. 2 structured according to a link-state routing protocol of the second ad-hoc network assuming a second distance-vector protocol in the second ad-hoc network, according to an illustrative embodiment.

The resulting link-state based virtual topology is depicted as virtual topology 500*a* in FIG. 5A. Note that this virtual topology 500*a* contains link 220. Note that virtual topology 500*a* presents information on the connections between the various nodes in the ad-hoc network. In particular, virtual topology 500*a* represents a snapshot of the network showing the nodes that are accessible from the border node, and what paths one would have to use to transmit data packets from nodes in the first network to nodes in the second network, or vice-versa.

Referring now to FIGS. 2, 3, 4B, and 5B, again assume that for ad-hoc network structure 200 in FIG. 2, network 201 utilizes a link-state protocol and network 202 utilizes a distance-vector protocol. However, assume that each node 202*a*-202*f* in network 202 creates and stores a list of only the minimum distances associated with reaching all destination nodes in network 202 via network paths involving the node's neighbors.

The link-state based virtual topology of the combined network created by control unit 302 (step 448) could again be obtained by interpreting the distance-vector routing information to obtain link-state representation. For instance, node 202*e* can inform border node 202*d*/201*f* that it is 1 hop from node 202*f*, 2 hops from each of nodes 202*a* and 202*b*, and 3 hops from node 202*c*. This information implies that there is a link between nodes 202*e* and 202*f*. Similarly, node 202*b* can inform border node 202*d*/201*f* that node 202*b* is 1 hop from each of nodes 202*c*, 202*a*, and 202*f*, and 2 hops from node 202*e*. This information implies that there is a link between nodes 202*b* and 202*c*, a link between nodes 202*b* and 202*a*, and a link between nodes 202*b* and 202*f*. In addition, border node 202*d*/201*f* will know that it is 1 hop from nodes 202*e* and 202*b*. Thus, there is a link between the border node and node 202*b*, as well as between the border node and node 202*e*. However, the combination of this information does not imply that nodes 202*f* and 202*a* are linked. In particular, the minimum distance from node 202*d* to node 202*a* (2 hops via node 202*b*) will be stored. The non-minimum distance(s) e.g. the distance from node 202*d* to node 202*a* via node 202*e* (3 hops via node 202*e*) will not be stored. The resulting link-state based virtual topology is depicted as virtual topology 500*b* in FIG. 5B. Note that this virtual topology 500*b* does not contains link 220.

Figure 4C:
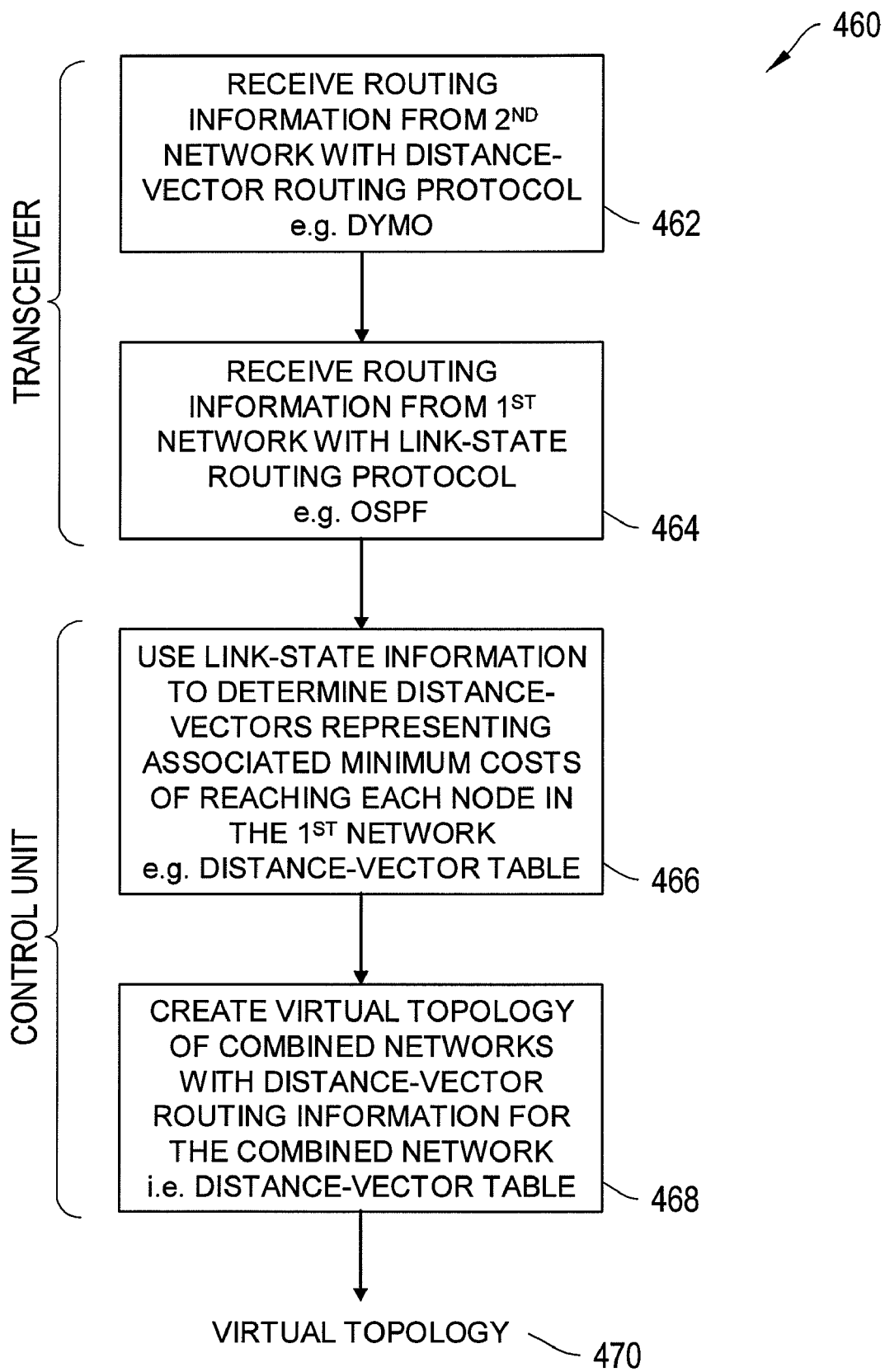
FIG. 4C shows a process flow diagram for use by a border node for generating a virtual topology of a combination of an ad-hoc network structured according to a distance-vector protocol, according to an illustrative embodiment.

FIG. 4C is a process flow diagram for a process 460 carried out by a border node, e.g., border node 300 of FIG. 3 or border node 201*f*/202*d* of FIG. 2, for generating and disseminating a virtual topology 470 of a combination of two ad-hoc networks in which the first ad-hoc network uses a link-state routing protocol and the second ad-hoc network uses a distance-vector protocol. This virtual topology 470 is structured according to the distance-vector protocol.

Referring to FIGS. 2, 3, and 4C, process 460 begins when transceiver 304 in border node 300 receives routing information for a second ad-hoc network e.g. network 202 (step 462). This routing information is structured according to a distance-vector protocol. Transceiver 306 in border node 300 of FIG. 3 then receives routing information for a first network e.g. network 201, structured according to a link-state protocol (step 464).

In one embodiment, control unit 302 in border node 300 of FIG. 3 generates a virtual combination of the two networks structured according to the distance vector protocol (step 466). The generated structure may be stored in the form of a routing information table listing the nodes in the network and minimum distance associated with reaching all destination nodes in the combined network, or in any other suitable manner. A virtual topology can then be created based on this information (step 468).

Referring now to FIGS. 2, 3, 4B, and 6A, assume that for network structure 200 in FIG. 2, ad-hoc network 201 utilizes a link-state protocol and ad-hoc network 202 utilizes a distance-vector protocol. Furthermore, assume a distance-vector protocol such that each node 202*a*-202*f* in network 202 creates and stores a list of the minimum distances associated with reaching all destination nodes in network 202 via its neighboring nodes.

Figure 6A:
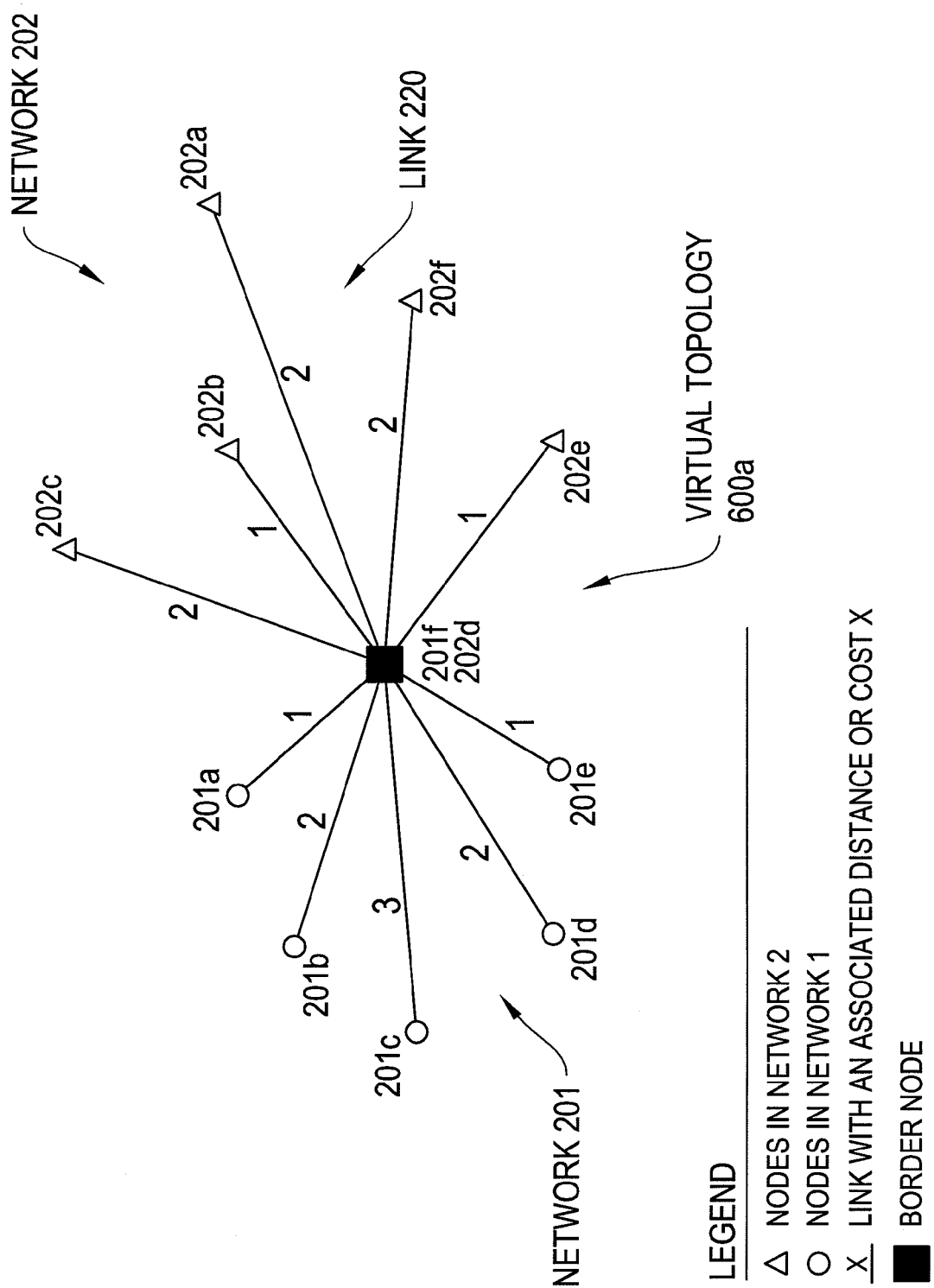
FIG. 6A is an exemplary virtual topology of the ad-hoc networks in FIG. 2 structured according to a distance-vector routing protocol from the point of view of a border node, according to an illustrative embodiment.

The distance-vector based virtual topology of the combined ad-hoc network created by control unit 302, from the point-of-view of the border node 202*d*/201*f*, is depicted by virtual topology 600*a* of FIG. 6A. Each link in virtual topology 600*a* is annotated with the minimum distance (minimum number of hops) associated with transmitting data packets from border node 202d/201f to the other nodes in the combined network. For instance, there are at least two paths from border node 202d/201f to node 201b in network 201. One of these paths consists of nodes 202d/201f, 201a, and 201b (2 hops). Another path consists of nodes 202d/201f, 201e, 201d, 201c, and 201b (4 hops). In this case, the first path is the one with the least number of hops. Thus, in virtual topology 600a, the link from border node 202d/201f to node 201b is annotated with a "2".

Figure 6B:
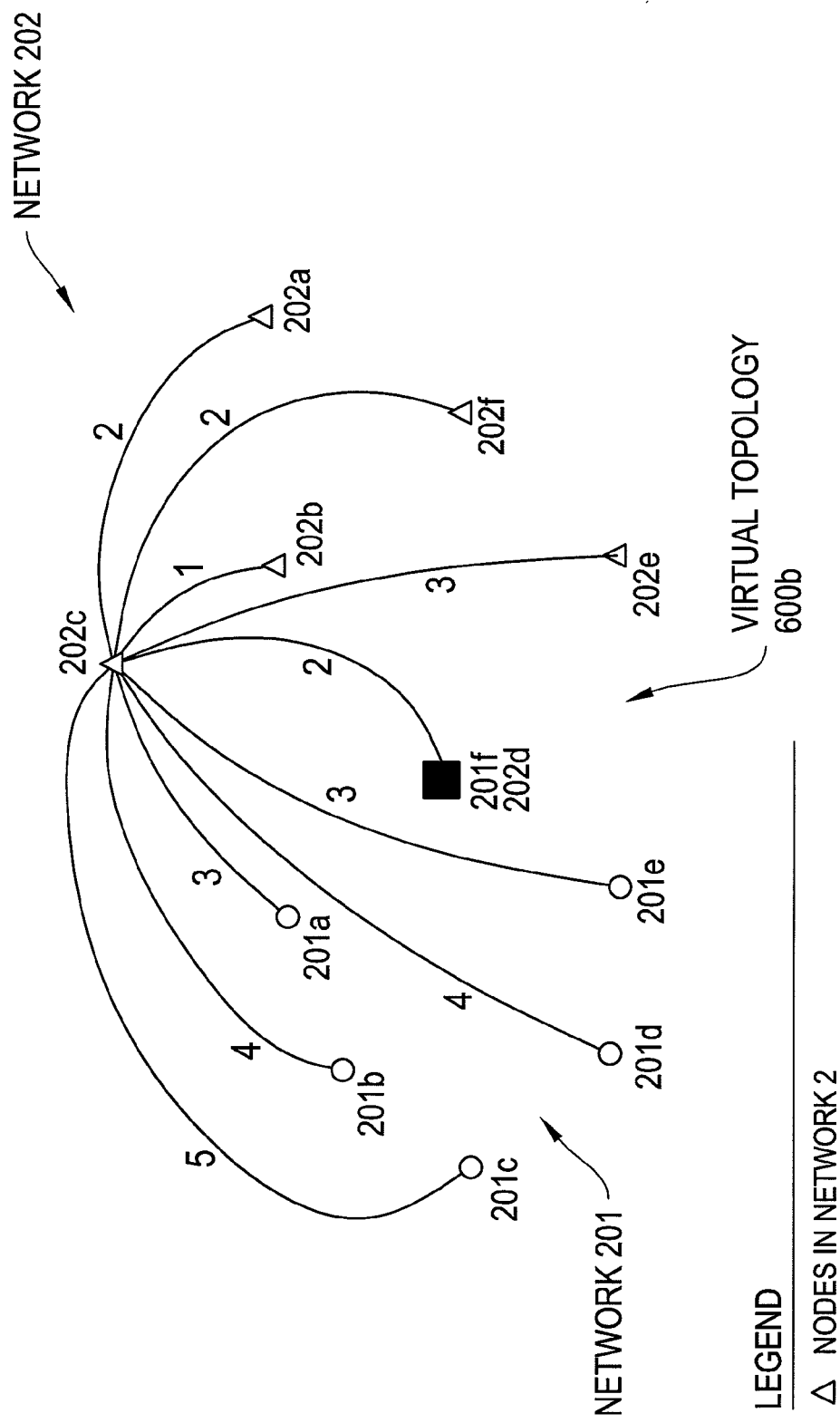
FIG. 6B is an exemplary virtual topology of the ad-hoc networks in FIG. 2 structured according to a distance-vector routing protocol from the point of view of a node in the first network, according to an illustrative embodiment.

The distance-vector based virtual topology of the combined network created by control unit 302, from the point-of-view of the node 202c, is depicted by virtual topology 600b of FIG. 6B. Again, each link in virtual topology 600b is annotated with the minimum distance (minimum number of hops) associated with transmitting data packets from node 202c to the other nodes in the combined network. For instance, there are at least two paths from node 202c in network 202 to node 201e in network 201. One of these paths consists of nodes 202c, 202b, 202a, 202f, 202e, 202d/201f, and 201e (6 hops). However, the path with the least number of hops consists of nodes 202c, 202b, 202d/201f, and 201e (3 hops). Thus, in virtual topology 600b, the link from node 202c to node 201e is annotated with a "3".

The invention may be embodied in other specific forms without departing from the spirit or essential characteristics thereof. For instance, the systems, devices, and methods described herein may be applied to any wireless or wired network, without limitation. The routing protocols in each of the networks could be reactive, proactive, link-state based, distance-vector based, or any combination thereof. The forgoing embodiments are therefore to be considered in all respects illustrative, rather than limiting of the invention.

What is claimed is:

1. A non-transitory computer-readable medium storing computer executable instructions, which, when executed by a processor, cause the processor to carryout a method for routing data through a first ad-hoc network and a second ad-hoc network comprising:
   receiving routing information structured according to a first routing protocol associated with a plurality of nodes in the first ad-hoc network;
   receiving routing information structured according to a second routing protocol associated with a plurality of nodes in the second ad-hoc network;
   generating a first virtual topology of a combination of the first and second ad-hoc networks according to the first routing protocol;
   disseminating the first virtual topology to nodes in the first ad-hoc network; and
   forwarding a packet from a node in the first ad-hoc network to a node in the second ad-hoc network based at least in part on the first virtual topology.

2. The computer-readable medium of claim 1, further comprising computer executable instructions, which, when executed by a processor, cause the processor to:
   generate a second virtual topology of a combination of the first and second ad-hoc networks according to the second routing protocol;
   disseminate the second virtual topology to nodes in the second ad-hoc network; and
   forward a packet from a node in the second ad-hoc network to a node in the first ad-hoc network based at least in part on the second virtual topology.

3. The computer-readable medium of claim 1, wherein the first routing protocol is a reactive protocol and the second routing protocol is proactive.

4. The computer-readable medium of claim 1, wherein the first routing protocol is a proactive protocol and the second routing protocol is reactive.

5. The computer-readable medium of claim 1, wherein the first routing protocol is a link state protocol and the second routing protocol is a distance vector protocol.

6. The computer-readable medium of claim 5, wherein the virtual topology includes a list of nodes in the first and second ad-hoc networks with the associated cost of information transmission through each of the nodes.

7. The computer-readable medium of claim 1, wherein the first routing protocol is a distance vector protocol and the second routing protocol is a link state protocol.

8. The computer-readable medium of claim 7, wherein the virtual topology includes a list of nodes in the first and second ad-hoc networks with the associated minimum costs of reaching each node in the first ad-hoc network.

9. The computer-readable medium of claim 1, wherein the first and second routing protocols are link state protocols.

10. The computer-readable medium of claim 9, wherein the virtual topology includes a list of nodes in the first and second ad-hoc networks with the associated cost of information transmission through each of the nodes.

11. The computer-readable medium of claim 1, wherein the first and second routing protocols are distance vector protocols.

12. The computer-readable medium of claim 11, wherein the virtual topology includes a list of nodes in the first and second ad-hoc networks with the associated minimum costs of reaching each node in the first ad-hoc network.

13. A method for routing data through a first ad-hoc network and a second ad-hoc network comprising:
   receiving at a border node belonging to at least the first and second ad-hoc networks routing information structured according to a first routing protocol associated with a plurality of nodes in the first ad-hoc network;
   receiving at the border node routing information structured according to a second routing protocol associated with a plurality of nodes in the second ad-hoc network;
   generating at the border node a first virtual topology of a combination of the first and second ad-hoc networks according to the first routing protocol;
   disseminating by the border node the first virtual topology to nodes in the first ad-hoc network; and
   forwarding a packet from a node in the first ad-hoc network to a node in the second ad-hoc network based at least in part on the first virtual topology.

14. The method of claim 13, further comprising:
   generating at the border node a second virtual topology of a combination of the first and second ad-hoc networks according to the second routing protocol;
   disseminating by the border node the second virtual topology to nodes in the second ad-hoc network; and
   forwarding a packet from a node in the second ad-hoc network to a node in the first ad-hoc network based at least in part on the second virtual topology.

15. The method of claim 13, wherein the first routing protocol is a reactive protocol and the second routing protocol is proactive.

16. The method of claim 13, wherein the first routing protocol is a proactive protocol and the second routing protocol is reactive.

17. The method of claim 13, wherein the first routing protocol is a link state protocol and the second routing protocol is a distance vector protocol.

18. The method of claim 17, wherein the virtual topology includes a list of nodes in the first and second ad-hoc networks with the associated cost of information transmission through each of the nodes.

19. The method of claim 13, wherein the first routing protocol is a distance vector protocol and the second routing protocol is a link state protocol.

20. The method of claim 19, wherein the virtual topology includes a list of nodes in the first and second ad-hoc networks with the associated minimum costs of reaching each node in the first ad-hoc network.

21. The method of claim 13, wherein the first and second routing protocols are link state protocols.

22. The method of claim 21, wherein the virtual topology includes a list of nodes in the first and second ad-hoc networks with the associated cost of information transmission through each of the nodes.

23. The method of claim 13, wherein the first and second routing protocols are distance vector protocols.

24. The method of claim 23, wherein the virtual topology includes a list of nodes in the first ad-hoc network with the associated minimum costs of reaching each node in the first ad-hoc network.

25. A device for routing data through a first ad-hoc network and a second ad-hoc network comprising:
   a first transceiver in communication with at least one node in the first ad-hoc network;
   a second transceiver in communication with at least one node in the second ad-hoc network; and
   a control unit in communication with the first and second transceivers, wherein the control unit comprises:
   a processor; and
   a memory storing computer executable instructions, wherein the computer executable instructions, when executed by the processor, cause the processor to carryout a method for routing data through the first and second ad-hoc networks comprising:
      receiving routing information structured according to a first routing protocol associated with a plurality of nodes in the first ad-hoc network from the first transceiver;
      receiving routing information structured according to a second routing protocol associated with a plurality of nodes in the second ad-hoc network from the second transceiver;
      generating a first virtual topology of a combination of the first and second ad-hoc networks according to the first routing protocol;
      disseminating the first virtual topology to nodes in the first ad-hoc network; and
      forwarding a packet from a node in the first ad-hoc network to a node in the second ad-hoc network based at least in part on the first virtual topology.

26. The device of claim 25, further comprising computer executable instructions, which, when executed by a processor, cause the processor to:
   generate a second virtual topology of a combination of the first and second ad-hoc networks according to the second routing protocol;
   disseminate the second virtual topology to nodes in the second ad-hoc network; and
   forward a packet from a node in the second ad-hoc network to a node in the first ad-hoc network based at least in part on the second virtual topology.

27. The device of claim 25, wherein the first routing protocol is a reactive protocol and the second routing protocol is proactive.

28. The device of claim 25, wherein the first routing protocol is a proactive protocol and the second routing protocol is reactive.

29. The device of claim 25, wherein the first routing protocol is a link state protocol and the second routing protocol is a distance vector protocol.

30. The device of claim 29, wherein the virtual topology includes a list of nodes in the first and second ad-hoc networks with the associated cost of information transmission through each of the nodes.

31. The device of claim 25, wherein the first routing protocol is a distance vector protocol and the second routing protocol is a link state protocol.

32. The device of claim 31, wherein the virtual topology includes a list of nodes in the first and second ad-hoc networks with the associated minimum costs of reaching each node in the first ad-hoc network.

33. The device of claim 25, wherein the first and second routing protocols are link state protocols.

34. The device of claim 33, wherein the virtual topology includes a list of nodes in the first and second ad-hoc networks with the associated cost of information transmission through each of the nodes.

35. The device of claim 25, wherein the first and second routing protocols are distance vector protocols.

36. The device of claim 35, wherein the virtual topology includes a list of nodes in the first and second ad-hoc networks with the associated minimum costs of reaching each node in the first ad-hoc network.

* * * * *